UNITED STATES PATENT OFFICE.

EZECHIEL WEINTRAUB, OF LYNN, MASSACHUSETTS, ASSIGNOR TO GENERAL ELECTRIC COMPANY, A CORPORATION OF NEW YORK.

METHOD OF MAKING BORON AND BORON ALLOYS.

1,019,569.  Specification of Letters Patent.  Patented Mar. 5, 1912.

No Drawing. Original application filed October 27, 1909, Serial No. 524,950. Divided and this application filed October 5, 1910. Serial No. 585,390.

*To all whom it may concern:*

Be it known that I, EZECHIEL WEINTRAUB, a citizen of the United States, residing at Lynn, county of Essex, State of Massachusetts, have invented certain new and useful Improvements in Methods of Making Boron and Boron Alloys, (division of my application filed October 27, 1909, Serial No. 524,950,) of which the following is a specification.

My present invention involves a method of reducing boron from its compounds and the production of bodies consisting of boron associated with small amounts of another element, such as carbon.

In an application, Serial No. 346,253, filed by me December 4, 1906, I have described the production of pure fused boron and have indicated various uses for it in the arts. As described by me in that application, and at more length in my application Serial No. 524,939, filed Oct. 27, 1909, pure fused boron is a fair conductor of electricity and has an enormous negative temperature resistance co-efficient. The peculiar properties of boron can be utilized in various applications in the arts, as for example, in pyrometers, wireless telegraphy and as a material for dies, jewels and drills. In some cases, the boron may be associated to advantage with a small amount of another element, such as carbon. The addition of a small amount of carbon increases the initial conductivity of the boron and lowers its extreme negative temperature resistance coefficient to an extent depending upon the amount of carbon added. For example, a few tenths of a per cent. of carbon may vary the resistance tenfold. In certain cases this effect is desirable. In a similar manner the presence of a small amount of carbon will modify the wear-resisting qualities of the boron when used as a bearing or die.

According to the present method of making boron containing a small percentage of carbon, a carbon filament is heated to incandescence in a mixture of vaporized boron chlorid and hydrogen, thereby depositing pure boron on the surface of the filament. If boron containing a small percentage of carbon is desired, the deposition is continued until a relatively thick rod of boron has been formed. During this process, especially if the temperature is raised considerably, the carbon diffuses through the mass of boron. If a perfectly homogeneous product is desired, the mass is fused down in an arc by methods described in my co-pending application, Serial No. 524,947. As the carbon filament has a very small mass, and the deposit of boron can be made quite thick if desired, the percentage of carbon in the final product may be made practically as small as desired. If it is desired to produce thick rods with a higher percentage of carbon, the carbon is deposited simultaneously with the boron by adding to the mixture of boron chlorid and hydrogen a vaporized carbon compound, such as gasolene or carbon tetrachlorid. The actual proportions used depend, of course, upon the amount of carbon desired in the final product. I find that boron chlorid and gasolene are completely miscible, and therefore can be mixed in liquid form and vaporized at the desired rate either by dropping into a vessel which is somewhat heated, carrying the vapor off with a stream of hydrogen, or by merely passing the hydrogen gas over the liquid mixture.

In the parent application, of which this is a division, claims are made on boron associated with a small amount of another element, such as carbon.

What I claim as new and desire to secure by Letters Patent of the United States, is,—

1. The process which consists in bringing a mixture containing boron halid and reducing gas into contact with a heated surface thereby depositing boron thereon.

2. The method of coating a conductor, which consists in heating the conductor in a mixture containing boron chlorid and reducing gas.

3. The process which consists in bringing a gaseous mixture containing boron chlorid vapor and hydrogen into contact with an incandescent surface thereby depositing boron on the surface.

4. The process which consists in incandescing a carbon conductor in a mixture containing boron chlorid and hydrogen to deposit boron on the surface of said conductor.

5. The process of depositing boron and carbon on a heated surface which consists in subjecting the surface to a mixture of boron halid, hydrogen and a hydrocarbon.

6. The process of depositing boron and carbon on a heated surface which consists in subjecting the surface to a mixture comprising boron chlorid, hydrogen and gasolene.

In witness whereof, I have hereunto set my hand this 3rd day of October, 1910.

EZECHIEL WEINTRAUB.

Witnesses:
JOHN A. MCMANUS, Jr.,
FRANK G. HATTIE.